(12) United States Patent
Iwasaki

(10) Patent No.: US 6,999,722 B2
(45) Date of Patent: Feb. 14, 2006

(54) COMMUNICATION DEVICE AND ITS CONTROL PARAMETER SETTING METHOD

(75) Inventor: Junichi Iwasaki, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 536 days.

(21) Appl. No.: 10/232,673

(22) Filed: Sep. 3, 2002

(65) Prior Publication Data

US 2003/0083012 A1 May 1, 2003

(30) Foreign Application Priority Data

Oct. 30, 2001 (JP) ............................ 2001-333055

(51) Int. Cl.
*H04B 5/00* (2006.01)

(52) U.S. Cl. ..................................... 455/41.2; 455/418

(58) Field of Classification Search .................. 455/41, 455/566, 41.2, 41.1, 410, 434, 515, 161.2, 455/343, 66.1, 41.3, 418, 411
See application file for complete search history.

(56) References Cited

U.S. PATENT DOCUMENTS 6,748,195 B1 * 6/2004 Phillips ..................... 455/41.2

2001/0019956 A1 * 9/2001 Tada ........................... 455/434
2004/0009749 A1 * 1/2004 Arazi et al. ................. 455/41.2

FOREIGN PATENT DOCUMENTS

JP 2001-189689 7/2001

OTHER PUBLICATIONS

Bluetooth, "Specification of the Bluetooth System: *Wireless Connections Made Easy*", Specification vol. 2, Version 1.1, Feb. 22, 2001, 5 pages.

* cited by examiner

*Primary Examiner*—Lee Nguyen
(74) *Attorney, Agent, or Firm*—Finnegan, Henderson, Farabow, Garrett & Dunner, L.L.P.

(57) ABSTRACT

A memory stores at least one item of parameter setting information corresponding to respective available environments which are initially set by the user. When the wireless communication function of a portable wireless communication device is made active by powering on, etc., a control section controls a wireless section to allow a search of any wirelessly accessible terminal present within reach of a radio signal. Then the control section infers available environments by comparing the result of the search with surrounding terminal information stored in the memory. Also, the control section reads out control parameter setting information stored in the memory in accordance with the result of the inference and sets the read-out control parameter setting information to the wireless section.

12 Claims, 4 Drawing Sheets

FIG. 3A  Sa (Office)

FIG. 3B  Sb (Home)

| |
|---|
| ⋮ |
| Connectable mode |
| ⋮ |
| Security mode 3 |
| ⋮ |
| Dial-up network service    Unavailable |
| ⋮ |
| LAN access service         Available |
| ⋮ |
| Object push service        Available |
| ⋮ |
| File transfer service      Unavailable |
| ⋮ |

Pa (Office)

F I G. 2A

| |
|---|
| ⋮ |
| Connectable mode |
| ⋮ |
| Security mode 1 |
| ⋮ |
| Dial-up network service    Available |
| ⋮ |
| LAN access service         Available |
| ⋮ |
| Object push service        Available |
| ⋮ |
| File transfer service      Available |
| ⋮ |

Pb (Home)

F I G. 2B

| |
|---|
| ⋮ |
| Disconnectable mode |
| ⋮ |
| Security mode 3 |
| ⋮ |
| Dial-up network service    Unavailable |
| ⋮ |
| LAN access service         Unavailable |
| ⋮ |
| Object push service        Available |
| ⋮ |
| File transfer service      Unavailable |
| ⋮ |

Px (Others)

F I G. 2C

| | | | | | |
|---|---|---|---|---|---|
| 00 | 11 | 22 | 33 | 00 | 01 |
| 00 | 11 | 22 | 33 | 00 | 02 |
| 00 | 11 | 22 | 33 | 00 | 0a |
| 00 | aa | aa | aa | aa | aa |
| 00 | aa | bb | cc | dd | ee |

FIG. 5

| | | | | | |
|---|---|---|---|---|---|
| 00 | 00 | 00 | 33 | 33 | 33 |
| 00 | 22 | 44 | 66 | 88 | aa |

FIG. 6

| | | | | | |
|---|---|---|---|---|---|
| 00 | 11 | 22 | 33 | 44 | 55 | 1.00 |
| 00 | 11 | 22 | 33 | 44 | 56 | 0.50 |
| 00 | 11 | 22 | 33 | 44 | 58 | 1.00 |
| 00 | 11 | 22 | 33 | 44 | 5a | 1.00 |
| 00 | 11 | 22 | 33 | 44 | 5f | 0.50 |
| 00 | 11 | 22 | 33 | 48 | 00 | 0.50 |
| 00 | 11 | 22 | 33 | 48 | 0e | 0.50 |
| 00 | 55 | 55 | 55 | 55 | 55 | 1.00 |
| 00 | 55 | 55 | 55 | 66 | 77 | 1.00 |
| 00 | 55 | ff | ff | ff | ff | 1.00 |

Sa1 (Office)

FIG. 7A

| | | | | | |
|---|---|---|---|---|---|
| 00 | 11 | 22 | 33 | 00 | 01 | 1.00 |
| 00 | 11 | 22 | 33 | 00 | 0a | 1.00 |
| 00 | aa | aa | aa | aa | aa | 1.00 |
| 00 | aa | bb | cc | dd | ee | 1.00 |
| 00 | dd | 00 | 00 | 00 | 0a | 0.50 |

Sb1 (Home)

FIG. 7B

| | | | | | |
|---|---|---|---|---|---|
| 00 | 11 | 22 | 33 | 44 | 55 | 1.00 |
| 00 | 11 | 22 | 33 | 44 | 58 | 1.00 |
| 00 | 11 | 22 | 33 | 44 | 5a | 1.00 |
| 00 | 11 | 22 | 33 | 44 | 5f | 0.75 |
| 00 | 11 | 22 | 33 | 48 | 00 | 0.75 |
| 00 | 11 | 22 | 33 | 48 | 0e | 0.75 |
| 00 | 55 | 55 | 55 | 55 | 55 | 0.50 |
| 00 | 55 | 55 | 55 | 66 | 77 | 1.00 |
| 00 | 55 | ff | ff | 11 | ff | 0.50 |
| 00 | 55 | ff | ff | ff | ff | 1.00 |
| 00 | aa | aa | aa | aa | aa | 0.50 |
| 00 | aa | aa | aa | aa | ab | 0.50 |

Sa2 (Office)

FIG. 8A

| | | | | | |
|---|---|---|---|---|---|
| 00 | 11 | 22 | 33 | 00 | 01 | 1.00 |
| 00 | 11 | 22 | 33 | 00 | 02 | 0.50 |
| 00 | 11 | 22 | 33 | 00 | 0a | 1.00 |
| 00 | aa | aa | aa | aa | aa | 1.00 |
| 00 | aa | bb | cc | dd | ee | 1.00 |

Sb2 (Home)

FIG. 8B

COMMUNICATION DEVICE AND ITS CONTROL PARAMETER SETTING METHOD

CROSS-REFERENCE TO RELATED APPLICATIONS

This application is based upon and claims the benefit of priority from the prior Japanese Patent Application No. 2001-333055, filed Oct. 30, 2001, the entire contents of which are incorporated herein by reference.

BACKGROUND OF THE INVENTION

1. Field of the Invention

The present invention relates to a communication device having a function to search for any other communication device and connect the device to it and its control parameter setting method and, in particular, a communication device capable of reproducing control parameters which are initially set for each situation in accordance with an environment involved and its control parameter setting method.

2. Description of the Related Art

In recent years, attention has been paid to a wireless communication system in a personal area such as Bluetooth. In order to set the operation of respective wireless communication devices, control parameters of various user interface levels are defined, for example, under the Bluetooth standard, such as parameters respectively set at a slave operation (passive connecting time's operation), a master operation (active connecting time's operation) and standby operation, a connecting time's security setting parameter, and a parameter, etc., for setting a service provided at a slave operation.

As the method for setting these control parameters, use is made of not only a method for setting such control parameters in accordance with the need of the user but also a method, etc., for optimizing several control parameters for a specific object as in a communication device of Jpn. Pat. Appln. KOKAI Publication No. 2001-189689.

Since, however, the control parameter setting method using, for example, the communication device of the above-mentioned Publication No. 2001-189689 is not so configured as to automatically set those control parameters desired by the user, it has been necessary to, in the case where, for example, the wireless communication device possessed by the user enters into a plurality of environments, such as an office, a visiting destination and a home, set those important parameters for security, etc., in particular, at each entry into a different environment.

BRIEF SUMMARY OF THE INVENTION

The present invention has been achieved with the above situation in view and the embodiment of the present invention is to provide a communication device and its control parameter setting method which can reproduce control parameters which are initially set for each situation in accordance with an environment involved and its control parameter setting method.

In order to achieve the above-mentioned embodiment of the present invention there is provided a communication device having a control parameter relating to communication, the communication device comprising a searching unit configured to search any other accessible communication device; and a control unit configured to compare the result of search and information in association with the result of search and the control parameter, and set the control parameter as a control parameter for use in the communication on the basis of the comparison decision.

In this communication device, the control parameters initially set by the user for each situation are reproduced in accordance with an environment involved and an important control parameter such as the security can be maintained at all times to a state desired by the user.

Further, the control unit updates the information based on a result of the comparison decision between a result of the search at a time of starting the communication and the information. In this case, the information for inferring the environment involved is updated in accordance with the situation without forcing any operation to the user and it is possible to enhance its availability.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A to 2C each are a view showing a setting form of control parameters stored in the portable type wireless communication device of the present embodiment;

FIGS. 3A and 3B are a first form of surrounding terminal information stored in the portable type wireless communication device of the present embodiment;

FIG. 5 is a view showing a second form of a result of search in the portable type wireless communication device of the present embodiment;

FIG. 6 is a view showing a third form of a result of search in the portable type wireless communication of the embodiment;

FIGS. 7A and 7B each are a view showing a second form of surrounding terminal information stored in the portable type wireless communication device of the present embodiment;

FIGS. 8A and 8B each are a view showing a result of updating surrounding terminal information in the present embodiment;

DETAILED DESCRIPTION OF THE INVENTION

An embodiment of the present invention will be described below with reference to the accompanying drawing.

Figures 1, 4:
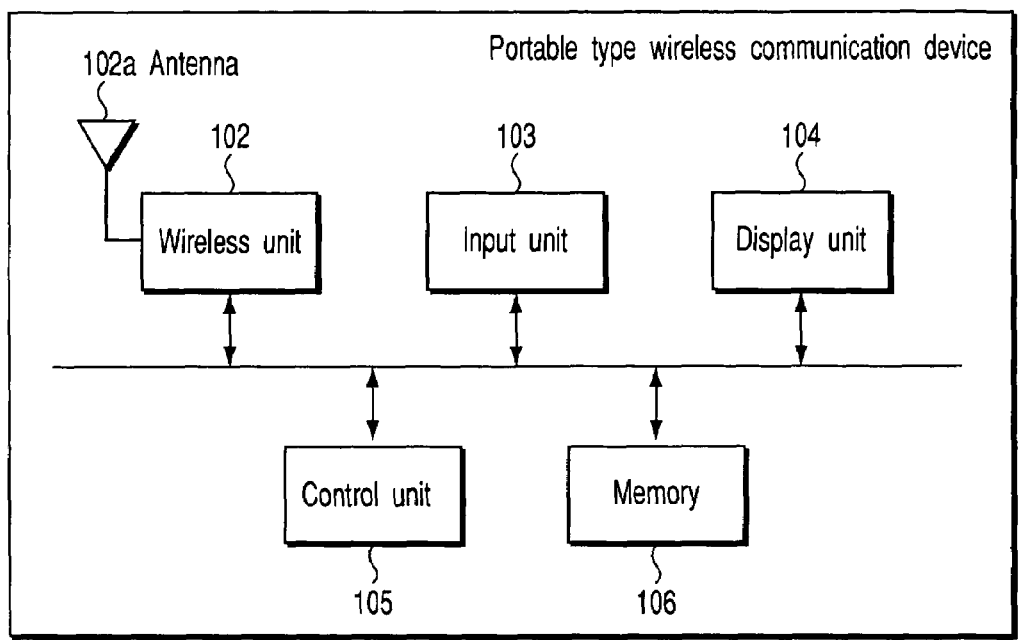
FIG. 1 is a view showing an arrangement of a portable type wireless communication device according to an embodiment of the present invention.
FIG. 4 is a view showing a first form showing a result of search in the portable type wireless communication device of the present embodiment.

FIG. 1 is a view showing an arrangement of a portable type wireless communication device according to this embodiment. The portable type wireless communication device 101 is comprised of, for example, a Personal Digital Assistant (PDA) capable of establishing a local wireless connection with a wirelessly connectable device, such as a personal computer, in an available circumstance such as an office, a visiting destination and a home and making a communication with the device.

As shown in FIG. 1, the portable type wireless communication device 101 has a wireless section 102, an input section 103, a display section 104, a control section 105 and a memory 106.

The wireless section 102 is comprised of a Bluetooth module configured to make wireless communication with other Bluetooth communication devices with the use of a radio signals of 2.45 GHz. Under the Bluetooth standard, various user interface level control parameters are defined such as those parameters at a slave operation (passive connecting time's operation), a master operation (active connecting time's operation) and a standby mode operation, a connected time's security setting parameter, a service setting parameter provided at a slave operation, and so on. These control parameters determine the operations of the wireless section 102.

The input section 103 and display section 104 constitute means for displaying the above-mentioned control parameters to a user and designating them. For example, the input section 103 is comprised of a keyboard and the display section 10 comprises a liquid crystal panel and its drive circuit.

The control section 105 controls a data transfer to and from other Bluetooth communication devices through the wireless section 102 as well as a data input and output to and from the memory 106. Further, the control section 105 controls the operations of the memory 106, input section 103 and display section 104 and controls such that the present embodiment serves as such a personal digital assistant.

In the portable type wireless communication device 101, the control parameters corresponding to the available environments are set by the user for security and convenience. FIGS. 2A to 2C show a setting format of the control parameters stored in the portable type wireless communication device 101. In FIGS. 2A to 2C, Pa, Pb and Px are, for example, control parameters set, respectively, at an office environment, a home environment and other environments, such as a visiting destination and, under these environments, a connectable/non-connectable mode for setting "connectable/non-connectable" from an external location, a security mode for setting an authentication level at a connected time, various "available/unavailable" services, and so on, are set by the user to suit his or her utilization purpose.

In the case where the user carries the portable type wireless communication device with him or her and uses it under a plurality of environments, the conventional practice is to set these control parameters or to store the control parameter setting information Pa, Pb, Px in the portable type wireless communication device, each time the environment varies. By doing so, the user selects either of these methods.

According to the present embodiment, on the other hand, when the control parameter setting information under each environment is stored in the portable type wireless communication device 101, a search is made for any wirelessly accessible terminals present within a reach of a radio signal and a result of the search is stored as surrounding terminal information in association with the control parameter setting information. FIGS. 3A to 3B show an example of the surrounding terminal information stored in the portable type wireless communication device 101.

Here, the surrounding terminal information is indicated as a list of Bluetooth addresses as a result of such a search. In FIGS. 3A and 3B, the surrounding terminal information Sa stored in association with Pa shows surrounding terminal information when the portable type wireless communication device 101 is utilized at the setting of the control parameter setting information Pa. This indicates that 10 terminals have been searched for around the device. Similarly, Sb shows the surrounding terminal information stored in association with Pb. According to the present embodiment, it is assumed that, for Px, there exists no surrounding terminal information.

Here, an explanation will be made below about the operation principle of this portable type wireless communication device 101.

When the wireless communication function of the portable type wireless communication device 101 is available, the control section 105 controls the wireless section 102 so as to search for any wirelessly accessible terminals present within a reach of a radio signal. Then the control section 105 infers the available environment by making a comparison between a result of the search and the surrounding terminal information stored in the memory 106, reads out the control parameter setting information stored in the memory 106 and sets it to the wireless section 102.

The inference of the available environment by the control section 105 is realized by calculating, from a result of the search and surrounding terminal information stored in the memory 106, a score relative to the respective surrounding terminal information as shown in an equation (1) and regarding an available environment corresponding to given surrounding terminal information of a maximum score as being an inference result.

$$A\ score = M/N \quad (1)$$

In this equation (1), N denotes the number of terminals registered in the surrounding terminal information and M denotes the number of terminals registered in the surrounding terminal information and searched. The maximum value of the score is unity. According to the present embodiment, if the score is less than 0.25, it does not correspond to the surrounding terminal information registered in Sa in FIG. 3A and in Sb in FIG. 3B and is inferred as being others. FIGS. 4 to 6 show results of searches in the portable type wireless communication device 101 by way of example.

The result of the searches is represented by a list of Bluetooth address of the terminals searched for. In the result of the search shown in FIG. 4, the scores about the surrounding terminal information Sa and Sb are 0.80 and 0.20, respectively. From this it is inferred that the available environment corresponds to the office environment. And the control parameter Pa as shown in FIG. 2A is set to the wireless section 102.

Further, in the result of the search shown in FIG. 5, the scores about the surrounding terminal information Sa and Sb are 0.00 and 0.80, respectively, and from this it is inferred that the available environment corresponds to the home environment. And the control parameter Pb as shown in FIG. 2B is set to the wireless section 102.

In the result of the search shown in FIG. 6, the scores about the surrounding terminal information Sa and Sb are 0.00 and 0.00, respectively, and from this it is inferred that the available environment corresponds to other available environments. And the control parameter Px shown in FIG. 2C is set to the wireless section 102.

In the portable type wireless communication device 101, the control parameters initially set by the user for each situation involved are automatically reproduced in accordance with the environment involved and an important control parameter, such as a security, can be maintained to a state desired by the user.

Incidentally, the surrounding terminal information used in the present invention reveals a past search result and it varies due to the operation conditions of the surrounding terminals, the movement of the terminals, and so on. In the present embodiment, the surrounding terminal information is updated by an operation as will be set out below so as to fit it to a corresponding variation. The search result and surrounding terminal information used in the inference of the above-mentioned available environment show the results of the present and past searches and, after inferring the available environment, the control section 105 updates the surrounding terminal information with the use of both and stores the updated surrounding terminal information in the memory 106.

The updating of the surrounding terminal information by the control section 105 is realized by calculating the frequency of appearances of terminals searched for in the present and past as shown, for example, in an equation (2) below, registering as the surrounding terminal information those terminals whose appearance frequencies are greater than a threshold value (0.25) and storing them in the memory 106.

$$\text{Appearance Frequency} = (x+y)/2 \quad (2)$$

In this equation (2), x denotes the appearance frequency of the terminals searched for in the past and y denotes the appearance frequency of the terminals searched for in the present. x is treated as being 0.00 in the case where the past appearance frequency is zero and y is treated as being 1.00 in the case where any terminal appears in the present and being 0.00 in the case where no terminal appears in the present. FIGS. 7A and 7B show examples of surrounding terminal information stored in the portable type wireless communication device 101 in the case where the surrounding terminal information is updated.

FIGS. 7A and 7B are different from FIGS. 3A and 3B in the surrounding terminal information, that is, in that, regarding the Bluetooth addresses of respective terminals, their appearance frequency is additionally stored. Here, in the case where the surrounding terminal information in the portable type wireless communication device 101 is as shown in FIGS. 7A and 7B, the available environment is inferred as being an office environment when the available environment is inferred from the search result of FIG. 4. Accordingly, the updating of the surrounding terminal information is effected between the surrounding terminal information Sa1 (that is, the past search result) and the search result of FIG. 4 (that is, the present search result).

FIG. 8A shows a result of updating the surrounding terminal information Sa1 by calculating the appearance frequency with the use of the equation (2). From this it is seen that nine terminals from Sa1 and new three terminals are registered in the surrounding terminal information Sa2. Similarly, FIG. 8B shows a result of updating the surrounding terminal information Sb1 (FIG. 7B) from a search result shown in FIG. 5. From this it is seen that four terminals from SR1 and one new terminal are registered in the surrounding terminal information Sb2.

According to the portable type wireless communication device 101, the environment inferring information is automatically updated in accordance with a change in situations without forcing the user to do any particular operation and it is possible to enhance its availability.

Figure 9:
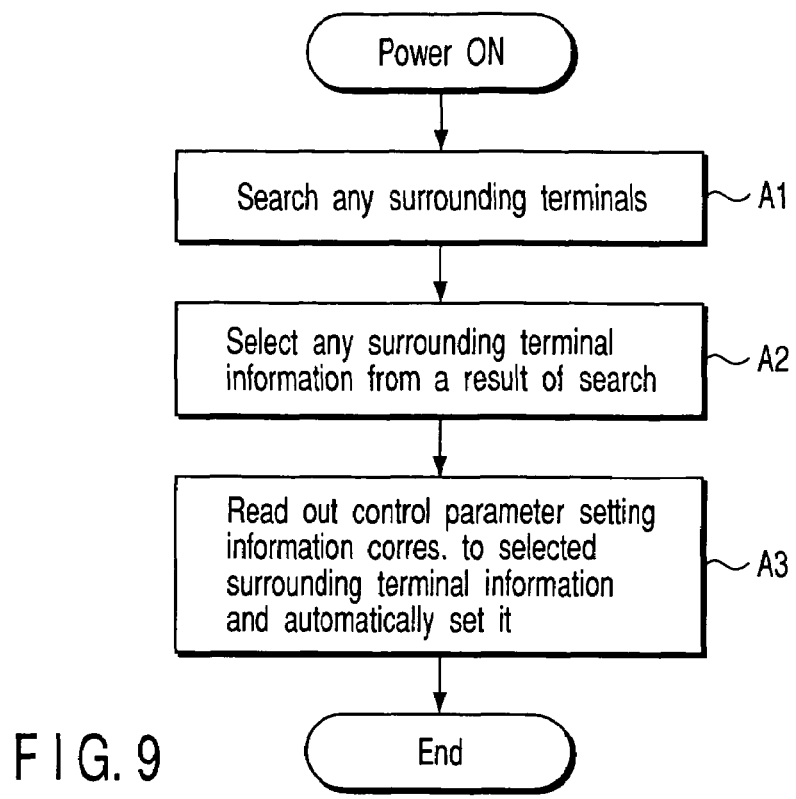
FIG. 9 is a flowchart showing an operation process when the portable type wireless communication device of the present embodiment automatically sets control parameters.
Figure 10:
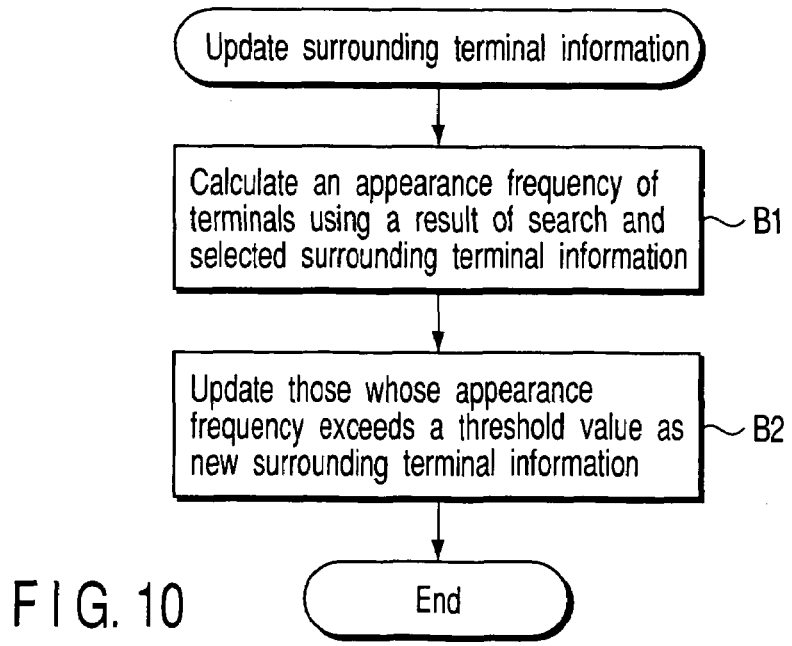
FIG. 10 is a flowchart showing an operation procedure when the portable type wireless communication device of the present embodiment updates surrounding terminal information.

FIGS. 9 and 10 show an operation procedure of this portable type wireless communication device 101. FIG. 9 is a flowchart showing an operation process when a control parameter is automatically set, while, on the other hand, FIG. 10 is a flowchart showing an operation process when the surrounding terminal information is updated.

When, for example, the wireless communication function of the portable type wireless communication device 101 is made active with a power-on operation, etc., the control section 102 controls the wireless section 102 to search for any wirelessly accessible terminal present within a reach of a radio signal (step A1 in FIG. 9).

Then the control section 105 infers an available environment by making a comparison between a search result and the surrounding terminal information stored in the memory 106 (step A2).

The control section 105 reads out control parameter setting information stored in the memory 106 in accordance with a result of inference and setting the readout control parameter setting information to the wireless section 102 (step A3).

Further, the control section 105 calculates the appearance frequency of respective terminals from the search result and surrounding terminal information (step B1 in FIG. 10) and stores those terminals whose appearance frequency is greater than the threshold value, as data, in the memory 106 (step B2) so as to register them in the surrounding terminal information.

In this way, the portable type wireless communication device 101 performs an operation of automatically reproducing control parameters which are initially set for each situation in accordance with an environment involved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device comprising:
   a searching unit configured to search for any other accessible communication device;
   a setting unit configured to set a control parameter relating to communication;
   a memory unit which stores information in association with a result of search by the searching unit and the control parameter set by the setting unit; and
   a control unit configured to compare the result of search by the searching unit and the information stored in the memory unit, and to set the control parameter relating to the communication on a basis of a comparison decision.

2. The communication device according to claim 1, wherein the control unit makes the comparison decision between a number of communication devices contained in the information and a number of communication devices searched by the searching unit.

3. The communication device according to claim 1, wherein the control unit updates the information based on a result of the comparison decision between the result of search at the time of starting the communication and the information.

4. A communication device according to claim 1, further comprising a display unit which displays a result of setting the control parameter by the control unit.

5. A communication device having a control parameter relating to a communication, comprising:
 a searching unit configured to search for any other accessible communication device;
 a control unit configured to compare the result of search by the searching unit and information in association with the result of search and the control parameter, and to set the control parameter as a control parameter for use in the communication on a basis of a comparison decision,
 wherein the control unit updates the information based on a result of the comparison decision between the result of search at the time of starting the communication and the information, and
 wherein the control unit calculates an appearance frequency of respective communication devices from the communication devices contained in the information and the communication devices searched by the searching unit, and updates the information based on a result of the calculation.

6. A method for setting a control parameter of a communication device having a searching unit configured to search any other accessible communication device, a setting unit configured to set the control parameter relating to communication and a memory unit which stores information in association with a result of search by the searching unit and the control parameter set by the setting unit, the method comprising:
 searching for any other accessible communication device by the searching unit;
 comparing the result of search and the information stored in the memory unit; and
 setting the control parameter relating to the communication on a basis of a comparison decision.

7. The method according to claim 6, wherein the comparison decision is made between a number of communication devices contained in the information and a number of communication devices searched by the searching.

8. The method according to claim 6, further comprising updating the information based on a result of the comparison decision between the result of the search at a time of starting the communication and the information.

9. The method according to claim 6, further comprising displaying a result of setting the control parameter.

10. A method for setting a control parameter of a communication device having a control parameter relating to a communication, the method comprising:
 searching for any other accessible communication device;
 comparing a result of search and information in association with the result of search and the control parameter, and setting the control parameter as a control parameter for use in the communication on the basis of a comparison decision; and
 updating the information based on a result of the comparison decision between the result of the search at a time of starting the communication and the information,
 wherein the updating the information is based on an appearance frequency of respective communication devices which are calculated from the communication devices contained in the information and the communication devices searched by the searching.

11. A wireless communication device for carrying out wireless communication based on the Bluetooth standard comprising:
 a searching unit configured to search for any other wireless accessible communication devices capable of making wireless communication based on the Bluetooth standard;
 a setting unit configured to set various kinds of control parameters for the wireless communication based on the Bluetooth standard including a connectable mode, a security mode, a presence/absence of a dial-up network service, a presence/absence of a LAN access service, a presence/absence of an object push service and a presence/absence of a file transfer service;
 a memory unit which stores information in association with a result of search by the searching unit and the control parameter set by the setting unit; and
 a control unit configured to compare the result of search and the information stored in the memory unit, and to set the various kinds of control parameters on a basis of a comparison decision.

12. A method for setting control parameters of a wireless communication device for carrying out wireless communication based on the Bluetooth standard, having a searching unit configured to search for any other wireless accessible communication device capable of making the wireless communication based on the Bluetooth standard, a setting unit configured to set various kinds of control parameters for the wireless communication based on the Bluetooth standard including a connectable mode, a security mode, a presence/absence of a dial-up network service, a presence/absence of a LAN access service, a presence/absence of an object push service and a presence/absence of a file transfer service, and a memory unit which stores information in association with a result of search by the searching unit and the control parameter set by the setting unit, the method comprising:
 searching for any other wireless communication devices by the searching unit;
 comparing the result of search and the information stored in the memory unit; and
 setting the various kinds of control parameters on a basis of a comparison decision.

* * * * *